US009655495B2

(12) United States Patent
Feddema

(10) Patent No.: US 9,655,495 B2
(45) Date of Patent: May 23, 2017

(54) DISHWASHER INCLUDING AN INCLINED GRATE FOR FILTRATION

(71) Applicant: Whirlpool Corporation, Benton Harbor, MI (US)

(72) Inventor: Mark S. Feddema, Kalamazoo, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 504 days.

(21) Appl. No.: 14/079,893

(22) Filed: Nov. 14, 2013

(65) Prior Publication Data

US 2014/0158170 A1    Jun. 12, 2014

Related U.S. Application Data

(60) Provisional application No. 61/734,020, filed on Dec. 6, 2012.

(51) Int. Cl.
*A47L 15/42* (2006.01)

(52) U.S. Cl.
CPC ....... *A47L 15/4208* (2013.01); *A47L 15/4202* (2013.01)

(58) Field of Classification Search
CPC ............. A47L 15/4202; A47L 15/4204; A47L 15/4208; A47L 15/42
USPC .................................................. 134/111, 56 D
See application file for complete search history.

(56) References Cited

U.S. PATENT DOCUMENTS

| 6,454,872 | B1 | 9/2002 | Miller et al. |
| 7,350,527 | B2 * | 4/2008 | Gurubatham ....... A47L 15/4206 134/104.1 |
| 7,594,513 | B2 | 9/2009 | Vanderroest et al. |
| 2006/0237035 | A1 * | 10/2006 | Ferguson ............ A47L 15/4204 134/10 |
| 2008/0116135 | A1 | 5/2008 | Rieger et al. |
| 2012/0273407 | A1 * | 11/2012 | Haque ................... B01D 29/07 210/335 |

FOREIGN PATENT DOCUMENTS

| EP | 0546922 A1 | 6/1993 |
| EP | 1207311 A2 | 5/2002 |
| GB | 2284980 A | 6/1995 |
| JP | 2003339612 A | 12/2003 |

* cited by examiner

*Primary Examiner* — Michael Barr
*Assistant Examiner* — Rita Adhlakha
(74) *Attorney, Agent, or Firm* — McGarry Bair PC

(57) ABSTRACT

A foreign object protection system for a dishwasher for treating dishes according to a cycle of operation includes a tub, a sump, a recirculation pump; and a foreign object protection system comprising a grate, wherein liquid in the tub collects in the sump and is recirculated by the recirculation pump such that the liquid is drawn through the foreign object grate.

17 Claims, 8 Drawing Sheets

DISHWASHER INCLUDING AN INCLINED GRATE FOR FILTRATION

CROSS-REFERENCE TO RELATED APPLICATIONS

The present application claims the benefit of U.S. Provisional Patent Application No. 61/734,020, filed Dec. 6, 2012, which is incorporated by reference herein in its entirety.

BACKGROUND OF THE INVENTION

Many contemporary dishwashers for use in a typical household include a wash tub for storing utensils during a wash cycle in which the stored utensils are cleaned. A dispensing system may be provided for dispensing a treating chemistry as part of the cycle of operation. A controller may be operably connected with the dispensing system and various other components of the dishwasher to execute the cycle of operation. The cycle of operation may be selected manually by the user or automatically based on one or more conditions determined by the controller. A pump may be provided to distribute liquid in the tub. A foreign object protector may be provided to protect the pump from objects that might harm the pump.

BRIEF DESCRIPTION OF THE INVENTION

In one aspect, the disclosure relates to a dishwasher for treating dishes according to at least one automatic cycle of operation, including a tub at least partially defining a treating chamber for receiving dishes for treatment according to the at least one automatic cycle of operation, a sump fluidly coupled to the tub and configured to collect liquid supplied to the tub, a recirculation pump having an inlet fluidly coupled to the sump and an outlet fluidly coupled to the tub to recirculate liquid from the sump to the treating chamber, and a foreign object protection system, disposed in the sump and separating the tub and the outlet, and further including an inclined grate having a first incline, a first valley, a second incline, and a second valley, and wherein the first valley is located downstream of the first incline, the second incline is located downstream of the first valley, and the second valley is located downstream of the second incline, and at least one opening located downstream of the second incline such that a foreign object must travel up and over the first incline and the second incline to reach the at least one opening. Liquid in the tub collects in the sump and may be recirculated by actuating the recirculation pump such that the liquid in the sump may be drawn through the grate and expelled through the outlet to the tub and the grate retains objects that cannot pass through the grate.

In another aspect, the disclosure relates to a dishwasher for treating dishes according to at least one automatic cycle of operation, including a tub at least partially defining a treating chamber for receiving dishes for treatment according to the at least one automatic cycle of operation, a sump fluidly coupled to the tub and configured to collect liquid supplied to the tub, a recirculation pump having an inlet fluidly coupled to the sump and an outlet fluidly coupled to the tub to recirculate liquid from the sump to the treating chamber, and a foreign object protection system comprising an inclined grate having a lower end and an upper end, a first incline, a first valley, a second incline, and a second valley, and wherein the foreign object protection system is disposed in the sump and separating the tub and the outlet, and a plurality of openings provided in the grate, with some of the openings near the lower end being smaller than some of the openings near the upper end. The first valley is located downstream of the first incline, the second incline is located downstream of the first valley, and the second valley is located downstream of the second incline, and wherein liquid in the tub collects in the sump and may be recirculated by actuating the recirculation pump such that the liquid in the sump may be drawn through the grate and expelled through the outlet to the tub and the grate retains objects that cannot pass through the grate.

DESCRIPTION OF EMBODIMENTS OF THE INVENTION

Figure 1:
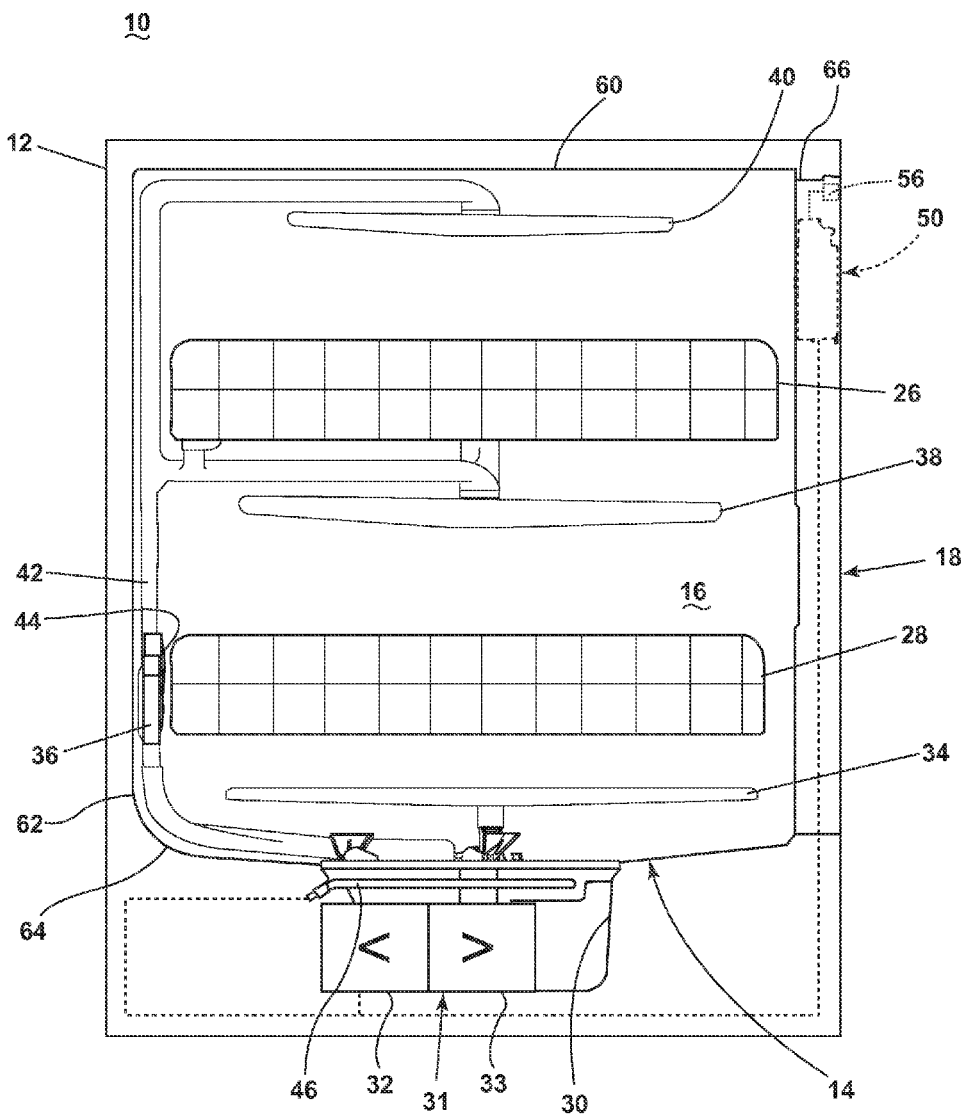
FIG. 1 is a schematic, side view of a dishwasher according to a first embodiment of the invention.

In FIG. 1, an automated dishwasher 10 according to a first embodiment is illustrated. While the illustrated treating appliance is a dishwasher 10, other treating appliances are possible, non-limiting examples of which include other types of dishwashing units, such as in-sink dishwashers, multi-tub dishwashers, or drawer-type dishwashers. The dishwasher 10 shares many features of a conventional automated dishwasher, which will not be described in detail herein except as necessary for a complete understanding of the invention. A chassis 12 may define an interior of the dishwasher 10 and may include a frame, with or without panels mounted to the frame. An open-faced tub 14 may be provided within the chassis 12 and may at least partially define a treating chamber 16, having an open face, for washing dishes. A door assembly 18 may be movably mounted to the dishwasher 10 for movement between opened and closed positions to selectively open and close the open face of the tub 14. Thus, the door assembly provides accessibility to the treating chamber 16 for the loading and unloading of dishes or other washable items.

It should be appreciated that the door assembly 18 may be secured to the lower front edge of the chassis 12 or to the lower front edge of the tub 14 via a hinge assembly (not shown) configured to pivot the door assembly 18. When the door assembly 18 is closed, user access to the treating chamber 16 may be prevented, whereas user access to the treating chamber 16 may be permitted when the door assembly 18 is open.

Dish holders, illustrated in the form of upper and lower dish racks 26, 28, are located within the treating chamber 16 and receive dishes for washing. The upper and lower racks 26, 28 are typically mounted for slidable movement in and out of the treating chamber 16 for ease of loading and unloading. Other dish holders may be provided, such as a silverware basket. As used in this description, the term "dish(es)" is intended to be generic to any item, single or plural, that may be treated in the dishwasher 10, including, without limitation; utensils, dishes, plates, pots, bowls, pans, glassware, and silverware.

A spray system is provided for spraying liquid in the treating chamber 16 and is provided in the form of a first lower spray assembly 34, a second lower spray assembly 36, a rotating mid-level spray arm assembly 38, and/or an upper spray arm assembly 40. Upper sprayer 40, mid-level rotatable sprayer 38 and lower rotatable sprayer 34 are located, respectively, above the upper rack 26, beneath the upper rack 26, and beneath the lower rack 24 and are illustrated as rotating spray arms. The second lower spray assembly 36 is illustrated as being located adjacent the lower dish rack 28 toward the rear of the treating chamber 16. The second lower spray assembly 36 is illustrated as including a vertically oriented distribution header or spray manifold 44. Such a spray manifold is set forth in detail in U.S. Pat. No. 7,594,513, issued Sep. 29, 2009, and titled "Multiple Wash Zone Dishwasher," which is incorporated herein by reference in its entirety.

With references to FIG. 1, a recirculation system is provided for recirculating liquid from the treating chamber 16 to the spray system. The recirculation system may include a sump 30 and a pump assembly 31. The sump 30 collects the liquid sprayed in the treating chamber 16 and may be formed by a sloped or recess portion of a bottom wall of the tub 14. The pump assembly 31 may include a wash pump or recirculation pump 33, a drain pump 32, a particle chopping assembly (not shown), and a foreign object protection system 100 (see FIG. 4). A suitable particle chopping assembly is set forth in detail in U.S. Pat. No. 6,454,872, filed Apr. 4, 2000, and titled "Dishwasher with Food Particle Chopping Assembly," which is incorporated herein by reference in its entirety. The foreign object protection system 100 will be discussed in detail below. The drain pump 32 may draw liquid from the sump 30 and pump the liquid out of the dishwasher 10 to a household drain line (not shown). The recirculation pump 33 may draw liquid from the sump 30 through the particle chopping assembly (not shown), and the liquid may be simultaneously or selectively pumped through a supply tube 42 to each of the assemblies 34, 36, 38, 40 for selective spraying. While not shown, a liquid supply system may include a water supply conduit coupled with a household water supply for supplying water to the treating chamber 16.

A heating system including a heater 46 may be located within the sump 30 for heating the liquid contained in the sump 30.

A controller 50 may also be included in the dishwasher 10, which may be operably coupled with various components of the dishwasher 10 to implement a cycle of operation. The controller 50 may be located within the door 18 as illustrated, or it may alternatively be located somewhere within the chassis 12. The controller 50 may also be operably coupled with a control panel or user interface 56 for receiving user-selected inputs and communicating information to the user. The user interface 56 may include operational controls such as dials, lights, switches, and displays enabling a user to input commands, such as a cycle of operation, to the controller 50 and receive information.

Figure 2:
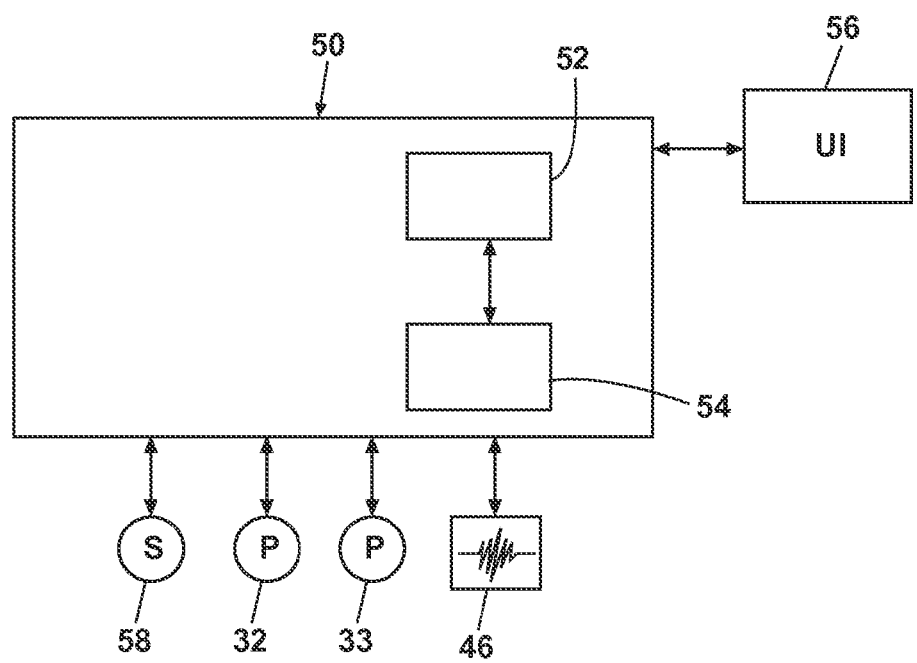
FIG. 2 is a schematic view of a control system of the dishwasher in FIG. 1.

As illustrated schematically in FIG. 2, the controller 50 may be coupled with the heater 46 for heating the wash liquid during a cycle of operation, the drain pump 32 for draining liquid from the treating chamber 16, and the recirculation pump 33 for recirculating the wash liquid during the cycle of operation. The controller 50 may be provided with a memory 52 and a central processing unit (CPU) 54. The memory 52 may be used for storing control software that may be executed by the CPU 54 in completing a cycle of operation using the dishwasher 10 and any additional software. For example, the memory 52 may store one or more pre-programmed cycles of operation that may be selected by a user and completed by the dishwasher 10. The controller 50 may also receive input from one or more sensors 58. Non-limiting examples of sensors that may be communicably coupled with the controller 50 include a temperature sensor and turbidity sensor to determine the soil load associated with a selected grouping of dishes, such as the dishes associated with a particular area of the treating chamber.

Figure 3:
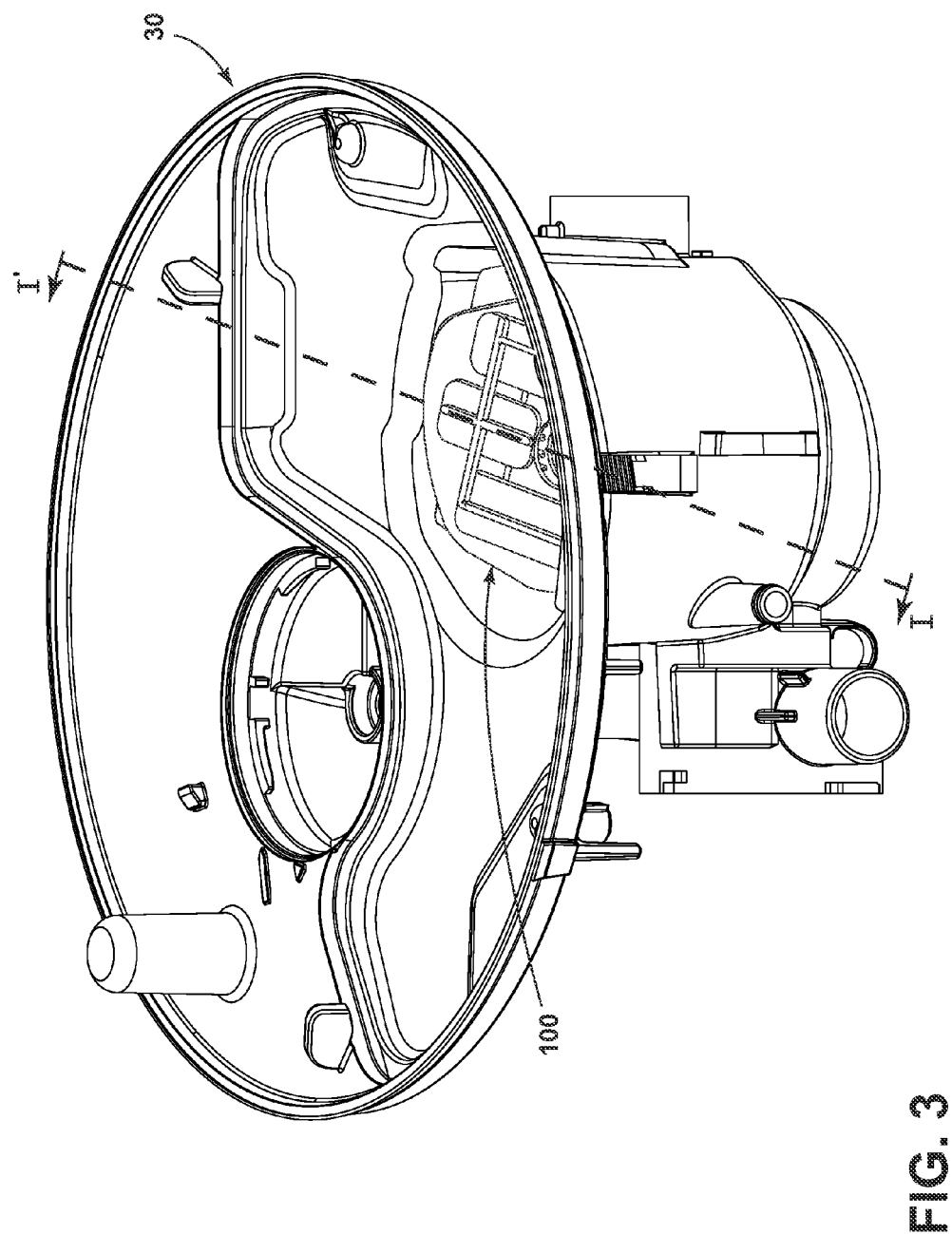
FIG. 3 is a top perspective view of a sump that includes a foreign object protection system that may be used in the dishwasher in FIG. 1.
Figure 4:
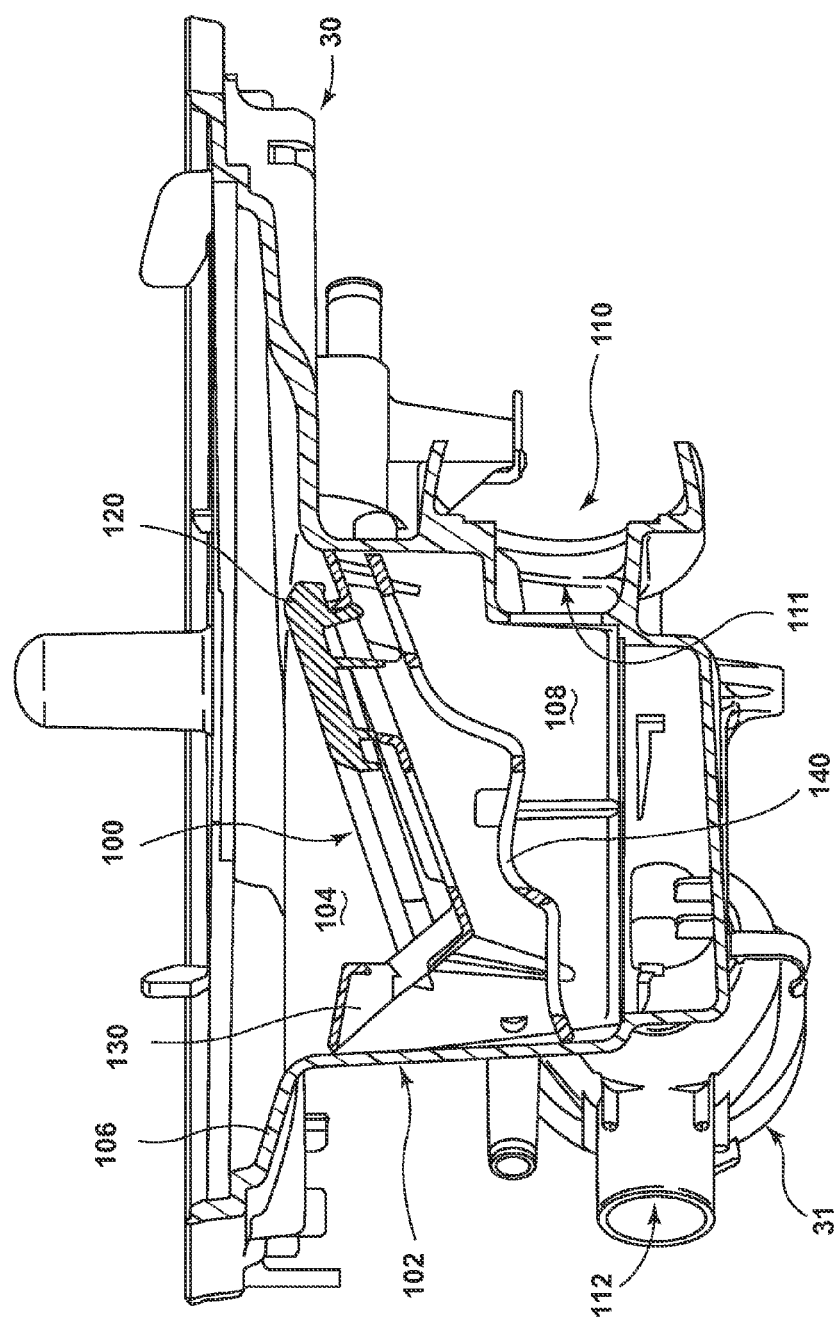
FIG. 4 is a side sectional view of a foreign object protection system in a sump taken along line I-I' of FIG. 3.

Particular reference will now be made to FIGS. 3-8 in describing further details of the foreign object protection system 100. FIG. 3 shows the sump 30 with a foreign object protection system 100 in place. Turning now to FIG. 4, the sump 30 includes a housing 102 having a central recessed area 104. The foreign object protection system 100 fits securely within the central recessed area 104 such that the foreign object protection system 100 is positioned on an angle with respect to the sump 30. The foreign object protection system 100 may be held in place by means of a snap or fastener (not shown), but it is not necessary. The housing 102 may include a downward sloping portion 106 that leads to the central recessed area 104 and a washing fluid collection reservoir or pumping chamber 108. In accordance with the most preferred form of the invention, pumping chamber 108 includes a recirculation portion 110, including a recirculation inlet 111, and a discharge/drain portion 112.

Figure 5:
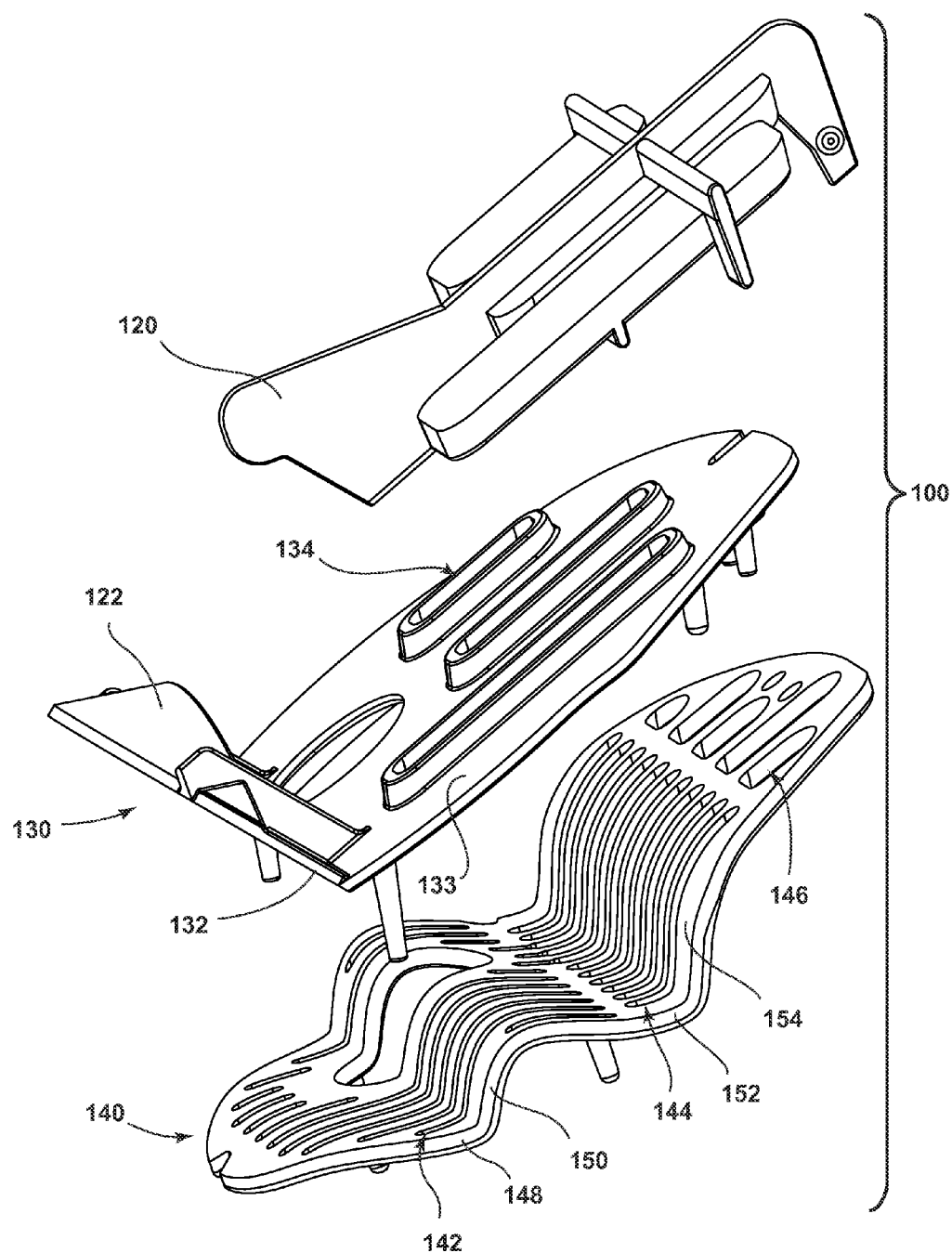
FIG. 5 is an exploded top perspective view of a foreign object protection system that may be used in the dishwasher in FIG. 1.
Figure 6:
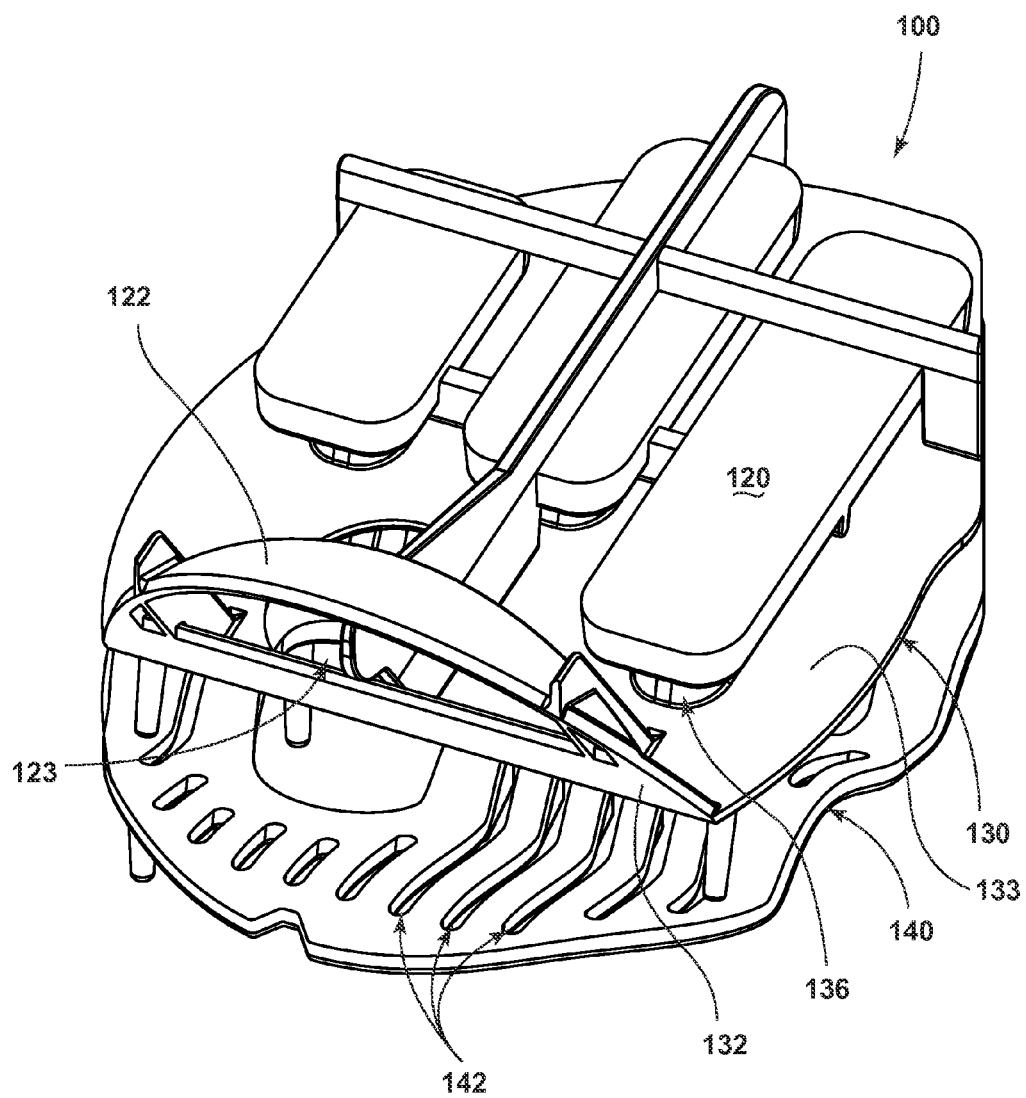
FIG. 6 is a top perspective view of a foreign object protection system that may be used in the dishwasher in FIG. 1.

Referring to FIG. 5, the example foreign object protection system 100 may include a top cover 120, a first lay 130, and a second lay 140. In other embodiments of the invention, one or more of these pieces 120, 130, 140 may be combined into a single integrated component. The top cover 120 engages with the first lay 130 to cover the first lay 130. The first lay 130 may include an inclined bypass wall 132 spaced apart from a bypass roof 122 such that water can flow through a bypass opening 123 between the bypass roof 122 and the bypass wall 132, but objects that are smaller than the bypass opening 123 are blocked from entering. The first lay 130 may also include a first lay wall 133 and at least one first lay opening 134 in the first lay wall 133 to allow water and small foreign objects to flow through the first lay 130 to reach the recirculation pump 33. Preferably, the first lay 130 includes at least one first lay opening 134 in the first lay wall 133. The first lay 130 engages with the second lay 140 such that a labyrinth path A' (see FIG. 7) is formed. Preferably, labyrinth path A' is about two millimeters wide or less in size, so items larger than the labyrinth path A' cannot pass through the labyrinth path A'. The second lay 140 may be an inclined grate and may include at least one second lay first opening 142, at least one second lay second opening 144, at least one second lay third opening 146, a first valley 148, a first incline 150, a second valley 152, and a second incline 154. The slope of the first incline 150 and the second incline 154 may vary, such that the first incline 150 and the second incline 154 may be vertical walls. The second valley 152 includes an area lower than the top of the first incline 150, such that a concavity is formed. Preferably, the second lay 140 includes a plurality of second lay first openings 142, second lay second openings, 144, and second lay third openings 146. Preferably, the second lay first openings 142 are about two millimeters wide or less, the second lay second openings 144 are about three millimeters wide or less, and the second lay third openings 146 are about five millimeters wide or less. In other embodiments of the invention, the second lay first openings 142 may be connected to the second lay second openings 144 and the second lay third openings 146, so as to comprise a single opening of either fixed or variable width.

Figure 7:
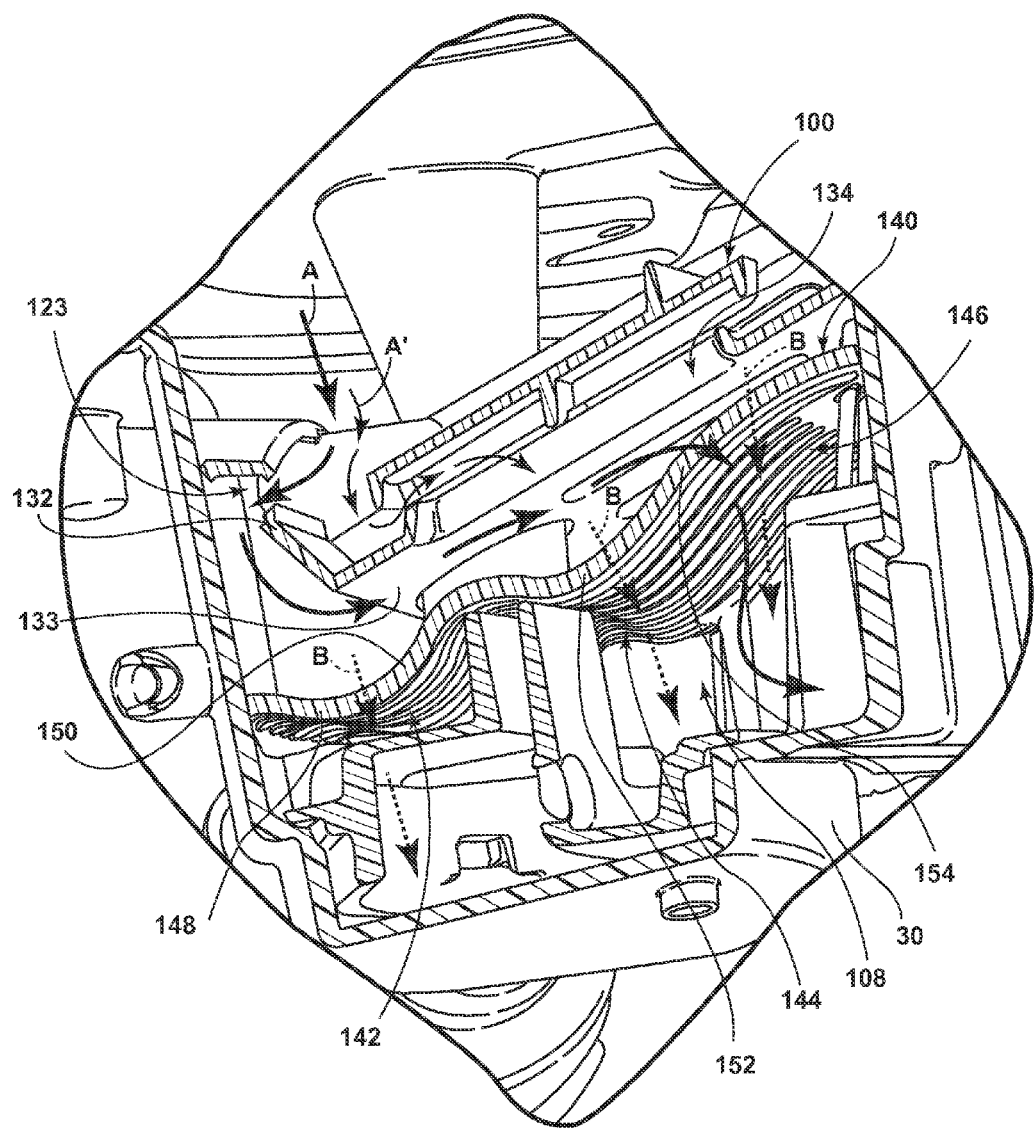
FIG. 7 is a side perspective sectional view of a foreign object protection system in a sump taken along line I-I' of FIG. 3.
Figure 8:
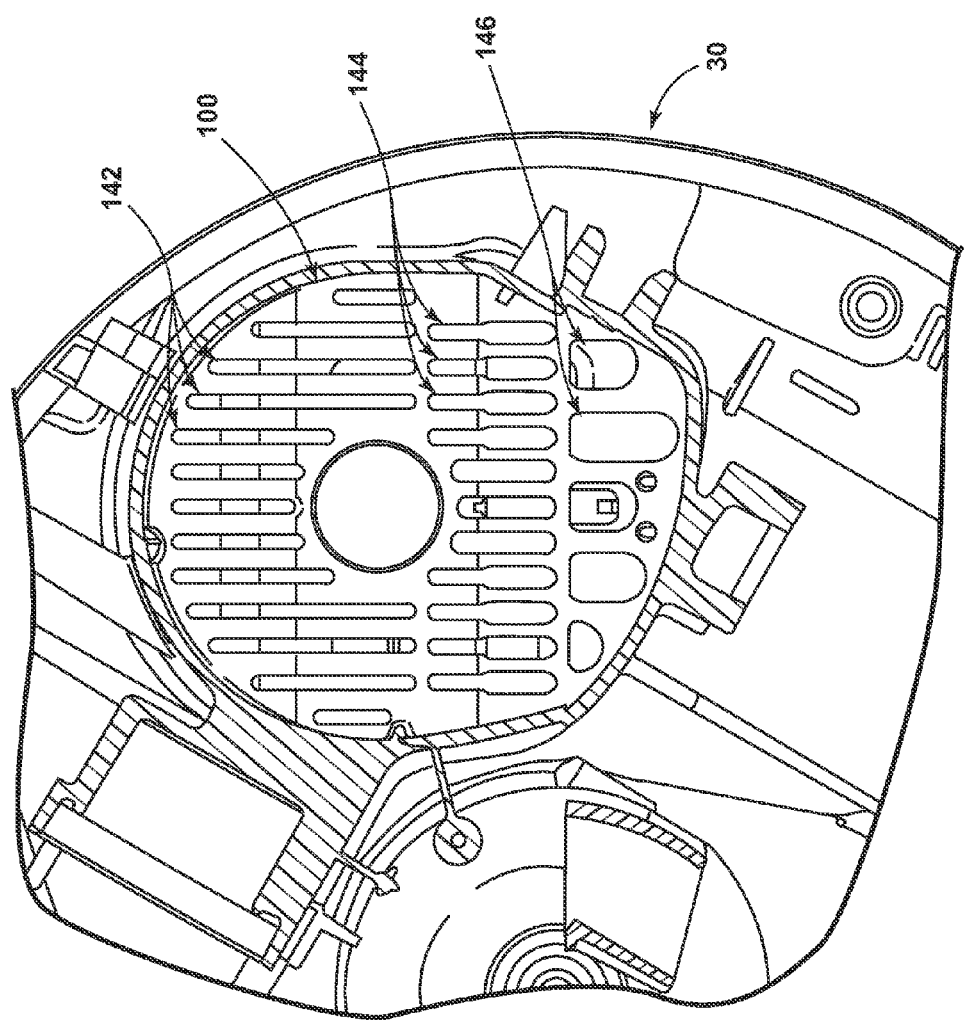
FIG. 8 is a bottom sectional view of a foreign object protection system in a sump that may be used in the dishwasher in FIG. 1.

In operation, and referring now to FIG. 7, the foreign objection protection system 100 functions like a screen in the sump 30. Foreign objects must travel through the foreign object protection system 100 following path A or A'. Water flows along paths B, which provides resistance for dense items moving through the foreign object protection system 100. The top cover 120 and the first lay 130 create a labyrinth path A' for capturing long, skinny items such as toothpicks. Heavy items such as screws will be trapped in the low point created by the intersection of bypass wall 132 and the first lay wall 133, while light items such as pieces of corn can travel up the incline and through the opening 123 between the bypass cover 123 and the bypass wall 132 to the second lay 140, and items that are smaller than about 2 millimeters can pass through the labyrinth path A' and the first lay openings 134. Foreign objects must then travel over the first incline 150 to reach the second valley 152 and the second lay second openings. Items that are too heavy to travel up the first incline 150 will be trapped in the first valley 148. Lighter, less dense items will travel up the first incline 150. Items smaller than the width of the second lay second openings 144 can pass through the second lay second openings 144 to the recirculation pump 33. Items larger than the width of the second lay second openings 144 must travel up the second incline 154. Items that are too heavy to travel up the second incline 154 will be trapped in the second valley 152. Lighter, less dense items will travel up the second incline 154 to the second lay third openings 146. Items smaller than the second lay third openings 146 can pass through the second lay third openings 146 to the recirculation pump 33. One example of the relative sizes of the second lay first openings 142, second lay second openings 144, and second lay third openings 146 are shown in FIG. 8, although others may be used.

Items that are too large to pass through the second lay third openings 146 and items that remain trapped in either the first valley 148 or the second valley 152, typically large, light food particles referred to as soils, remain trapped on the second lay 140. The pump assembly 31 (See FIG. 4) draws water through the foreign object protection system 100 whenever the pump is on. When the motor of the pump assembly 31 is paused, water rushes back into the pumping chamber 108. This inrush of water works to lift soft, less dense soils over the first and and second inclines 150, 154 such that the soils may be able to pass through the larger second lay second openings 144 or second lay third openings 146, while dense foreign objects remain trapped in the first valley 148. Soils that are too large to pass through the second lay third openings 146 remain trapped in the second valley 152.

When the sump 30 is drained, the soils dehydrate. They then rehydrate when the sump 30 fills again. The process of continuous dehydration and rehydration promotes breakdown of the soils better than traditional foreign object protection systems in which soils are contained low in the sump such that they never have the opportunity to dehydrate.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims. Further, it will be understood that any features of the above described embodiments may be combined in any manner.

What is claimed is:

1. A dishwasher for treating dishes according to at least one automatic cycle of operation, comprising:
    a tub at least partially defining a treating chamber for receiving dishes for treatment according to the at least one automatic cycle of operation;
    a sump fluidly coupled to the tub and configured to collect liquid supplied to the tub;
    a recirculation pump having an inlet fluidly coupled to the sump and an outlet fluidly coupled to the tub to recirculate liquid from the sump to the treating chamber; and
    a foreign object protection system comprising an inclined grate having a lower end and an upper end, a first incline, a first valley, a second incline, and a second valley, and wherein the foreign object protection system is disposed in the sump and separating the tub and the outlet, and a plurality of openings provided in the grate, with some of the openings near the lower end being smaller than some of the openings near the upper end;
    wherein the first valley is located upstream of the first incline, the second incline is located downstream of the first valley, and the second valley is located upstream of the second incline, and wherein liquid in the tub collects in the sump and may be recirculated by actuating the recirculation pump such that the liquid in the sump may be drawn through the grate and expelled through the outlet to the tub and the grate retains objects that cannot pass through the grate.

2. The dishwasher of claim 1 further comprising a chopper fluidly coupled to the sump and a drain to chop food soils that are able to pass through the grate.

3. The dishwasher of claim 1 wherein the foreign object protection system further comprises a cover and a first lay.

4. The dishwasher of claim 3, wherein the cover and the first lay create a labyrinth path for capturing foreign objects that are longer than a predetermined length.

5. The dishwasher of claim 4, wherein the first lay includes a bypass feature that creates a bypass path alternate to the labyrinth path.

6. The dishwasher of claim 1, wherein the grate comprises a second lay.

7. The dishwasher of claim 6, wherein the second lay includes at least one first opening.

8. The dishwasher of claim 7, wherein the at least one first opening is not more than about two millimeters wide.

9. The dishwasher of claim 6, wherein the second lay includes an at least one incline and an at least one valley.

10. The dishwasher of claim 6, wherein the second lay includes the first incline, the first valley, the second incline, and the second valley.

11. The dishwasher of claim 10, wherein the second lay comprises an at least one second opening.

12. The dishwasher of claim 11, wherein the at least one second opening is not more than about three millimeters wide.

13. The dishwasher of claim 11, wherein the second lay comprises an at least one third opening.

14. The dishwasher of claim 13, wherein the at least one third opening is not more than about five millimeters wide.

15. The dishwasher of claim 13, wherein the at least one third opening is located downstream of the second incline such that a foreign object must travel up and over the first incline and the second incline to reach the at least one third opening.

16. The dishwasher of claim 11, wherein the at least one second opening is located downstream of the first incline such that a foreign object must travel up and over the first incline to reach the at least one second opening.

17. A dishwasher for treating dishes according to at least one automatic cycle of operation, comprising:
   a tub at least partially defining a treating chamber for receiving dishes for treatment according to the at least one automatic cycle of operation;
   a sump fluidly coupled to the tub and configured to collect liquid supplied to the tub;
   a recirculation pump having an inlet fluidly coupled to the sump and an outlet fluidly coupled to the tub to recirculate liquid from the sump to the treating chamber; and
   a foreign object protection system, disposed in the sump and separating the tub and the outlet, and comprising:
      an inclined grate having a first incline, a first valley, a second incline, and a second valley, and wherein the first valley is located upstream of the first incline, the second incline is located downstream of the first valley, and the second valley is located upstream of the second incline; and
      at least one opening located downstream of the second incline such that a foreign object must travel up and over the first incline and the second incline to reach the at least one opening;
   wherein liquid in the tub collects in the sump and may be recirculated by actuating the recirculation pump such that the liquid in the sump may be drawn through the grate and expelled through the outlet to the tub and the grate retains objects that cannot pass through the grate.

* * * * *